(12) United States Patent
Vinciarelli (10) Patent No.: US 10,050,519 B2
(45) Date of Patent: Aug. 14, 2018

(54) CONTROL OF BUCK-BOOST POWER CONVERTER WITH INPUT VOLTAGE TRACKING

(71) Applicant: VLT, Inc., Sunnyvale, CA (US)

(72) Inventor: Patrizio Vinciarelli, Boston, MA (US)

(73) Assignee: VLT, Inc., Sunnyvale, CA (US)

( * ) Notice: Subject to any disclaimer, the term of this patent is extended or adjusted under 35 U.S.C. 154(b) by 0 days.

(21) Appl. No.: 15/368,208

(22) Filed: Dec. 2, 2016

(65) Prior Publication Data

US 2018/0159426 A1   Jun. 7, 2018

(51) Int. Cl.
| | | |
|---|---|---|
| *H02M 3/04* | (2006.01) | |
| *H02M 1/08* | (2006.01) | |
| *H02M 1/14* | (2006.01) | |
| *H02M 1/00* | (2006.01) | |

(52) U.S. Cl.
CPC ............ *H02M 3/04* (2013.01); *H02M 1/08* (2013.01); *H02M 1/14* (2013.01); *H02M 2001/0009* (2013.01); *H02M 2001/0048* (2013.01)

(58) Field of Classification Search
CPC .......................... H02M 3/156; H02M 3/1582
USPC ............... 323/222, 271, 282, 284, 285, 299
See application file for complete search history.

(56) References Cited

U.S. PATENT DOCUMENTS

| | | |
|---|---|---|
| 5,196,995 A | 3/1993 | Gulczynski |
| 5,734,258 A | 3/1998 | Esser |
| 5,745,351 A | 4/1998 | Taurand |
| 5,933,331 A | 8/1999 | Boldin et al. |
| 6,037,755 A | 3/2000 | Mao et al. |
| 6,069,804 A | 5/2000 | Ingman et al. |
| 6,141,227 A | 10/2000 | Sheikh et al. |
| 6,166,527 A | 12/2000 | Dwelley et al. |
| 6,396,250 B1 | 5/2002 | Bridge |
| 6,522,108 B2 | 2/2003 | Prager et al. |

(Continued)

FOREIGN PATENT DOCUMENTS

| | | |
|---|---|---|
| EP | 1 211 791 | 2/2011 |
| WO | WO-02/101909 | 12/2002 |

OTHER PUBLICATIONS

U.S. Appl. No. 10/264,327, filed Oct. 1, 2002, Vinciarelli, Patrizio.

(Continued)

*Primary Examiner* — Jeffrey Sterrett
(74) *Attorney, Agent, or Firm* — Foley & Lardner LLP (57) ABSTRACT

An improved power distribution architecture includes a voltage regulator configured to operate with its output voltage approximately equal to its input voltage for most of the time. The regulator set point can be set to follow the input voltage within a limited range and set to a minimum or maximum set point outside the range. An improved ZVSBB controller adaptively extends the I-O phase of the converter while the input to output voltage ratio is close to one and responds to changes in input-output voltage differential within a short response time. The controller may respond asymmetrically to voltage changes with a steep response to voltage differentials in the boost range and a shallow response to voltage differentials in the buck range. An improved ZVSBB converter may achieve a peak converter efficiency greater than 99% owing to substantial reductions in switching and inductor losses within a narrow input range.

52 Claims, 4 Drawing Sheets

(56) References Cited

U.S. PATENT DOCUMENTS

| | | | |
|---|---|---|---|
| 6,636,431 B2 | 10/2003 | Seki et al. | |
| 6,788,033 B2 | 9/2004 | Vinciarelli | |
| 6,930,893 B2 | 8/2005 | Vinciarelli | |
| 6,939,997 B2 | 9/2005 | Lappe et al. | |
| 6,984,965 B2 * | 1/2006 | Vinciarelli | H02J 1/102 323/266 |
| 7,145,786 B2 | 12/2006 | Vinciarelli | |
| 7,154,250 B2 | 12/2006 | Vinciarelli | |
| RE40,072 E | 2/2008 | Prager et al. | |
| 8,669,744 B1 | 3/2014 | Vinciarelli | |
| 8,860,384 B2 * | 10/2014 | Chen | H02M 3/1582 323/222 |
| 8,912,779 B2 * | 12/2014 | Ren | H02M 3/1582 323/259 |
| 9,018,800 B2 * | 4/2015 | Hester | G05F 1/67 307/82 |
| 9,419,431 B2 * | 8/2016 | Prexl | H02H 7/1213 |
| 2003/0142513 A1 | 7/2003 | Vinciarelli | |
| 2004/0027101 A1 * | 2/2004 | Vinciarelli | H02M 3/1582 323/259 |
| 2007/0109822 A1 | 5/2007 | Kuan | |
| 2008/0136387 A1 * | 6/2008 | Bertele | H02M 3/1582 323/282 |
| 2014/0354250 A1 * | 12/2014 | Deng | H02M 3/157 323/271 |
| 2015/0229215 A1 * | 8/2015 | Choudhary | H02M 1/14 323/271 |
| 2017/0155324 A1 * | 6/2017 | Choquet | H02M 3/1582 |
| 2017/0207704 A1 * | 7/2017 | Houston | H02M 3/1582 |

OTHER PUBLICATIONS

LTC3440, Micropower Synchronous Buck-Boost DC/DC Converter, integrated circuit manufactured by Linear Technology Corporation, Milpitas, CA, USA, Oct. 2001, p. 12.

Morrison, "A New Modulation Strategy for a Buck-Boost Input AC/DC Converter," IEEE Transactions on Power Electronics, vol. 16, No. 1, Jan. 2001, pp. 34-45.

Severns and Bloom, "Modem DC-To-DC Switchmode Power Converter Circuits," 1985, ISBN 0-42-21396-4, pp. 156-157.

* cited by examiner

CONTROL OF BUCK-BOOST POWER CONVERTER WITH INPUT VOLTAGE TRACKING

TECHNICAL FIELD

This invention describes apparatus and methods for reducing losses in switching power converters and systems.

BACKGROUND

"Switching loss" refers to power dissipated in a switch, e.g. when the switch is turned ON. Capacitances, both parasitic and lumped, across a switch if not discharged before the switch is turned ON may be a major contributor to switching loss, particularly in switching power converters operating at high frequencies. One way to reduce switching losses in a switching power converter (e.g., a buck, a boost, or a buck-boost switching power converter) uses an inductive current to charge and discharge the capacitances associated with a switch before turning it ON to achieve zero voltage switching ("ZVS"). ZVS ideally causes the voltage across the switch to decline to zero volts, essentially eliminating switching losses associated with the capacitive discharge of the switch; however, any significant reduction, e.g. by 50 percent, 80 percent, 90 percent, or more from the peak voltage across the switch, respectively reduces the switching losses during turn ON by as much as 75 percent, 96 percent, 99 percent, or more.

SUMMARY

An exemplary apparatus may include a non-isolated buck-boost switching power converter adapted to convert power from an input port at an input voltage, $V_{IN}$, to an output port at an output voltage, $V_{OUT}$, in a series of converter operating cycles having a minimum operating period, TOP-MIN. The power converter may include an inductor, a first switch, a second switch, and a controller connected to control the first and second switches. The first and second switches may couple the inductor to the input port and the output port during an input-output phase of each converter operating cycle. The controller may adjust the input-output phase as a function of the ratio, R, of $V_{IN}/V_{OUT}$ within a first predetermined range to (a) have a duration, TIO, that is at a maximum, TIO-MAX, when $V_{IN}/V_{OUT}$ is substantially equal to one; (b) have the duration, TIO, decreasing (i) for buck operation at a first slope for the difference, $V_{IN}-V_{OUT}$, increasing above zero, and (ii) for boost operation at a second slope for the difference, $V_{OUT}-V_{IN}$, increasing above zero; where (c) the maximum duration, TIO-MAX, is in a range between one and twenty times the minimum operating period, TOP-MIN.

Another exemplary apparatus may include a non-isolated buck-boost switching power converter adapted to convert power from an input port at an input voltage, $V_{IN}$, to an output port at an output voltage, $V_{OUT}$, and an output current, $I_{OUT}$, in a series of converter operating cycles having an minimum operating period, TOP-MIN. The power converter may include an inductor having a DC resistance RL, a first switch having an ON resistance $RS_1$, a second switch having an ON resistance $RS_2$, and a controller connected to control the first and second switches. The switches may be arranged to couple the inductor to the input port and the output port during an input-output phase of each converter operating cycle. The controller may adjust the input-output phase of each converter operating cycle to have a duration, TIO, that is less than or equal to a predetermined maximum, TIO-MAX, when $V_{IN}/V_{OUT}$ is substantially equal to one and decreases to a predetermined minimum, TIO-MIN as the absolute value of the difference, $V_{IN}-V_{OUT}$, increases. The power dissipation, averaged over the duration of a respective converter operating cycle, of the converter operated at the output current, $I_{OUT}$, may be less than two or three times the square of $I_{OUT}$ times the sum of RL, $RS_1$ and $RS_2$.

An exemplary method of converting power from an input port at an input voltage, $V_{IN}$, to an output port at an output voltage, $V_{OUT}$, may include providing an inductor a first switch and a second switch connected to the inductor and using a controller to (a) operate the first switch and the second switch in a series of converter operating cycles, each converter operating cycle having (i) a duration, TOP, (ii) an input phase having a duration, TIN, during which the input voltage is impressed across the inductor, (iii) an input-output phase having a duration, TIO, during which the first and second switches couple the inductor to the input port and the output port, and (iv) a ZVS interval during which one or more switches are discharged by a current flowing in the inductor. The controller may further (b) generate an error signal representing differences between the output voltage and a first reference for regulating the output voltage; (c) set the duration, TIN, of the input phase as a function of the input voltage and the error signal; (d) determine a minimum duration, TIO-MIN, of the input-output phase as function of the input voltage, the output voltage, and the error signal; and (e) determine an extension duration, TIO-ADD, of the input-output phase beyond the minimum TIO-MIN as a function of the ratio, R, of $V_{IN}/V_{OUT}$ within a first predetermined range to (i) be at a maximum, TIO-ADD=TIO-MAX, when the ratio R is substantially equal to one, (ii) decrease for $V_{IN}>V_{OUT}$ (buck operation) at a first slope (TIO-ADD=TIO-MAX-m1 ($V_{IN}-V_{OUT}$)), (iii) decrease for $V_{OUT}>V_{IN}$ (boost operation) at a second slope (TIO-ADD=TIO-MAX-m2 ($V_{OUT}-V_{IN}$)), and (f) limit the maximum duration, TIO-MAX, within a range that is between one and twenty times the minimum operating period, TOP-MIN. The total duration, TIO, of the input-output phase may be set to the sum of TIO-MIN and TIO-ADD.

Another exemplary method may include converting power from a source, at a source voltage, $V_{SRC}$, to an output port at an output voltage, $V_{OUT}$. A front end circuit having power conversion circuitry, a FE input for receiving power from the source, and a FE output may provide power at a front-end output voltage, VO-FE. A buck-boost switching regulator circuit having power conversion circuitry including an inductor, first and second switches coupled to the inductor, and a controller may receive power from the FE output via a regulator input and supply power at a regulated output voltage, $V_{REG}$, to regulator output. The controller may operate the first and second switches in a series of converter operating cycles, having an input-output phase during which the first and second switches couple the inductor to the regulator input and the regulator output. A minimum converter operating period, TOP-MIN, may be established and the duration, YIO, of the input-output phase may be adjusted as a function of the ratio, R, of $V_{IN}/V_{OUT}$ within a first predetermined range to (a) be at a maximum, TIO-MAX, when $V_{IN}/V_{OUT}$ is substantially equal to one; (b) decrease for $V_{IN}>V_{OUT}$ (buck operation) from the maximum at a first slope (TIO=TIO-MAX-m1 ($V_{IN}-V_{OUT}$)); (c) decrease for $V_{OUT}>V_{IN}$ (boost operation) from the maximum at a second slope (TIO=TIO-MAX-m2 ($V_{OUT}-V_{IN}$));

and (d) limit the maximum duration, TIO-MAX, within a range that is between one and twenty times the minimum operating period, TOP-MIN.

Alternate embodiments of the above exemplary methods and apparatus may include one or more of the following features. The controller may determine a cycle-by-cycle limit for the duration of the input-output phase, TIO-I based on the absolute value of the difference between $V_{IN}$ and $V_{OUT}$, $|V_{IN}-V_{OUT}|$; reduce the duration of the input-output phase of a present operating cycle, TIO-P, to a value that is less than the cycle-by-cycle limit, TIO-I; and perform the determining and reducing within a period of time that is less than one or two times the cycle-by-cycle limit, TIO-I or less than 50%, 25%, or 10% of the minimum operating period, TOP-MIN. The first predetermined range of the ratio $V_{IN}$/Vo may vary between a value less than one, corresponding to boost operation, and a value greater than one, corresponding to buck operation. The predetermined range may, for example, vary between 0.8 and 1.3. The first slope for buck operation may be less than the second slope for boost operation. The maximum duration, TIO-MAX, may be greater than three times or less than ten times the minimum operating period, TOP-MIN. The function may include integrating deviations between $V_{IN}$ and $V_{OUT}$. The function may include multiplying the absolute value of $|V_{IN}-V_{OUT}|$ by a first coefficient for buck operation and a second coefficient for boost operation so decreases in TIO for a given voltage differential are greater for buck operation than for boost operation. The function may include comparing the results of the integration with a threshold that is a function of a current being delivered to the output port. The function may provide a longer TIO for higher current being delivered to the output port than for lower current. The first predetermined range of the ratio $R=V_{IN}$/Vo may vary between one and a value less than one, corresponding to boost operation. The value may be 0.8. The first predetermined range of the ratio $R=V_{IN}$/Vo varies between one and a value greater than one, corresponding to buck operation. The value may be 1.3. The controller may regulate the output voltage VOUT to be equal to an average of the input voltage reduced by a current delivered to the output port multiplied by a resistance coefficient. The resistance coefficient may be a function of a temperature dependent resistance of the first and second switches and of the inductor.

The controller may accumulate the absolute value of the difference between VIN and VOUT, |VIN−VOUT| throughout the course of the input-output phase, terminate the input-output phase at a time before TIO determined by the accumulation, wherein the accumulating and terminating are performed within a period of time that is less than TIO-MIN. The total duration TIO, of the input-output phase may be at least 75% of the duration, TOP, of the converter operating cycle within a normal operating range of load current, IL, and with the ratio R being within the first predetermined range. The first predetermined range may include values of R ranging from 0.9 to 1.1. The extension duration, TIO-ADD, may be set to a maximum (TIO-ADD=TIO-MAX) when the output voltage is equal to the input voltage minus the product of the load current, $I_L$, and a lumped series resistance, Rt, of the converter ($V_{OUT}=V_{IN}-I_L*Rt$). The total duration, TIO, of the input-output phase may be limited to ensure ZVS operation of at least one of the switches at the end of the input-output phase.

An envelope of current drawn by the buck-boost switching regulator from the front end circuit may be adjusted to approximate a waveform of the source voltage. An envelope of current drawn by the buck-boost switching regulator from the front end circuit maybe adjusted to approximate a waveform of the output voltage of the front end, VO-FE. The front-end output voltage, VO-FE, may be set to a value that is approximately equal to the regulated output voltage, $V_{REG}$. An average of the front-end output voltage, VO-$FE_{AVG}$, may be determined and the buck-boost switching regulator may be controlled to set the regulated output voltage, $V_{REG}$, equal to VO-$FE_{AVG}$–C, where C is a constant or a function of output current. A DC transformer may be used to convert power received from the buck-boost switching regulator at the regulated voltage, $V_{REG}$, for delivery to a load at a unipolar load voltage, $V_{LOAD}$, via a transformer at an essentially fixed voltage transformation ratio, $K=V_{LOAD}/V_{REG}$.

Another exemplary apparatus may include a switching regulator adapted to convert power from an input port at an input voltage, $V_{IN}$, for delivery to an output port at an output voltage, $V_{OUT}$, within an acceptable output voltage range having a minimum, $V_{OUT-MIN}$, and a maximum, $V_{OUT-MAX}$, in a series of converter operating cycles having a predetermined minimum operating period, TOP-MIN, and a predetermined maximum operating period, TOP-MAX. The switching regulator may include an inductor, one or more power switches, and a controller connected to control the switches. The switches may be arranged to couple the inductor to the input port and the output port of the converter during an input-output phase. The controller may turn the switches ON and OFF during each converter operating cycle to control the output voltage, $V_{OUT}$, to be essentially equal to: (a) the input voltage while the input voltage remains within the acceptable output voltage range; (b) $V_{OUT-MIN}$ while the input voltage $V_{IN}$ is below $V_{OUT-MIN}$; and (c) $V_{OUT-MAX}$ while the input voltage $V_{IN}$ is greater than $V_{OUT-MAX}$.

The controller may further adjust the input-output phase as the ratio of $V_{IN}/V_{OUT}$ varies within a first predetermined range to (a) have a duration, TIO, that is at a maximum, TIO-MAX, when $V_{IN}/V_{OUT}$ is substantially equal to one; (b) the duration, TIO, decreasing (i) at a first slope for the difference, $V_{IN}-V_{OUT}$, increasing to greater than zero, and (ii) at a second slope for the difference, $V_{OUT}-V_{IN}$, increasing to greater than zero. The maximum duration, TIO-MAX, may be greater than the minimum operating period, TOP-MIN, and less than twenty times the minimum operating period, TOP-MIN. The first slope for boost operation may be greater than the second slope for buck operation. The maximum duration, TIO-MAX, may be greater than three times, or less than ten times the minimum operating period, TOP-MIN. The controller may determine a cycle-by-cycle limit for the duration of the input-output phase, TIO-I based on the absolute value of the difference between $V_{IN}$ and $V_{OUT}$, $|Vin-V_{OUT}|$; reduce the duration of the input-output phase of a present operating cycle, TIO-P, to a value that is less than the cycle-by-cycle limit, TIO-I; and perform the determining and reducing within a period of time that is less than twice the cycle-by-cycle limit, TIO-I.

The details of one or more embodiments of the invention are set forth in the accompanying drawings and description below. Other features, objects, and advantages of the invention will be apparent from the description and drawings, and from the claims.

DESCRIPTION OF THE DRAWINGS

Like references symbols in the various drawings indicate like elements.

DETAILED DESCRIPTION

Power distribution systems are typically designed to accommodate a wide range of input voltages reflecting various operating conditions. For example, a typical telecom system may convert power from the AC mains down to a nominally 48 volt DC distribution bus for supplying power to the electronic equipment. A battery backup system may be connected to provide power to the 48 Volt bus in the event of a power failure or other interruption in power. As a result of many factors, the nominal 48 Volt bus source can vary over a rather large range, e.g. from 32 to 72 Volts. Accommodating such a wide range of voltages frequently leads to trade-offs in conversion efficiency for the entire system.

Figure 1:
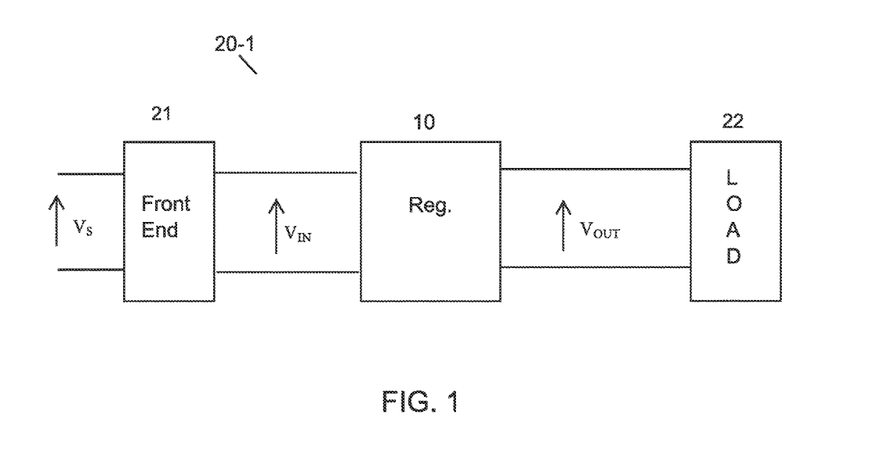
FIG. 1 shows an architecture for an improved power system.

An improved power distribution system 20-1 is shown in FIG. 1 including a front end converter 21 having an input for receiving power from an input source (not shown) at a source voltage, $V_S$, and an output which supplies conditioned power to the input of regulator 10 at an input voltage, $V_{IN}$. The regulating converter 10 provides power at a regulated output voltage, $V_{OUT}$, to the load 22. The regulating converter 10 may preferably be based upon a ZVS buck-boost topology such as described in Vinciarelli, Buck-Boost DC-DC Switching Power Conversion, U.S. Pat. No. 6,788,033 issued Sep. 7, 2004 (the "Buck-Boost Patent") or on one of a variety of switching power converters, including buck, boost, and buck-boot converters, as described in Vinciarelli, Adaptive Control of Switching Losses in Power Converters, U.S. Pat. No. 8,669,744, issued Mar. 11, 2014 (the "Adaptive Patent") and Buck and boost converters as described in Prager et al, Loss and Noise Reduction in Power Converters, U.S. Pat. No. RE40,072, reissued Feb. 19, 2008 (the "Clamped Patent"). Each of the aforementioned patents are assigned to VLT, Inc. and each is incorporated herein by reference in its entirety.

Figure 2:
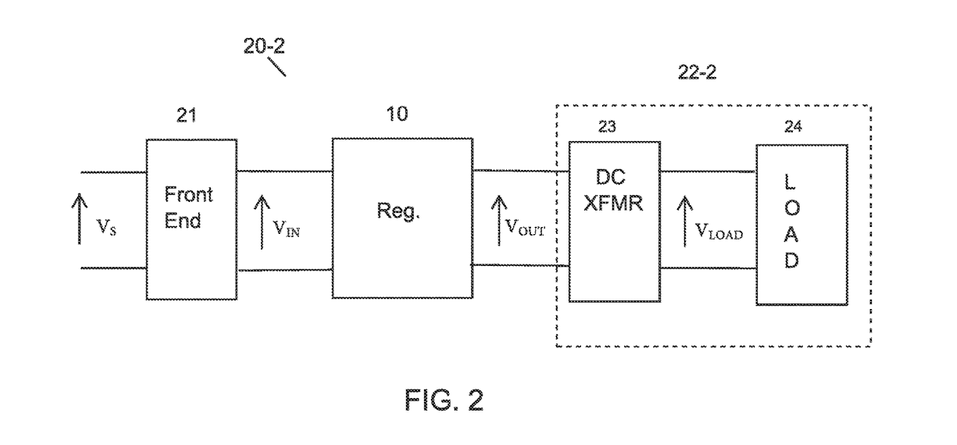
FIG. 2 shows an alternate embodiment of an architecture for an improved power system.

The load 22 in FIG. 1 may represent one or more individual loads, which may also include additional power conversion stages feeding electronic circuitry, and may be distributed throughout the electronic system. For example, as shown in FIG. 2, the power distribution system 20-2 may include a DC transformer 23 connected between the output of regulator 10 and the load 24. The DC transformer may provide voltage transformation and optionally isolation between the regulator and the load allowing for more efficient power distribution in the system. As defined herein, a DC Transformer delivers a DC output voltage, $V_{OUT}$, which is an essentially fixed fraction of the input voltage, $V_{IN}$, delivered to its input and may optionally provide isolation between its input and its output. The voltage transformation ratio or voltage gain of the DC-transformer is defined herein as the ratio, $K = V_{OUT}/V_{IN}$, of its output voltage, $V_{OUT}$, to its input voltage, $V_{IN}$, at a load current. The voltage-transformation ratio of a DC-Transformer may be fixed by design, e.g. by the converter topology, the timing architecture, and the turns ratio of the transformer. Preferably, the DC Transformer may be implemented using the Sine-Amplitude Converter ("SAC") topologies and timing architectures described in Vinciarelli, Factorized Power Architecture and Point of Load Sine Amplitude Converters, U.S. Pat. No. 6,930,893 and in Vinciarelli, Point of Load Sine Amplitude Converters and Methods, U.S. Pat. No. 7,145,786 (hereinafter the "SAC Patents"); and in Vinciarelli et al., Power Distribution Architecture with Series-Connected Bus Converter, U.S. application Ser. No. 13/933, 252 filed Jul. 2, 2013 (the "NIBA" application), all of which are assigned to VLT. Inc. and incorporated in their entirety herein by reference.

In the power distribution architectures 20-1 and 20-2 of FIGS. 1 and 2, the output voltage of the front end, $V_{IN}$, which typically may vary as a function of the source voltage, $V_S$, load, optional power factor correction algorithms, and other factors, preferably may be set to approximate the desired regulated output voltage, $V_{OUT}$, of the regulator 10 which regulates the output to the load. Configuring the system 20 to use a front end voltage, $V_{IN}$, that approximates the desired regulated voltage, $V_{OUT}$, may allow the regulator 10 to operate in a narrow range and be optimized for very high conversion efficiency for the majority of the system operation conditions, i.e. for when the input voltage is at its nominal value, which may be most of the time. Normal excursions from the nominal input voltage, $V_{IN}$, may be accommodated by the optimized regulator 10, albeit at operating efficiencies that are greater than those typical of converters operating over wider ranges of input voltages.

In power distribution systems, e.g. 20-1, 20-2 such as shown in FIGS. 1 and 2, in which the regulator 10 comprises a multiplicity of regulators 10 each driving an independent load and receiving power from a single front end 21, preferably the front end output voltage, $V_{IN}$, may be set to a value equal to the weighted average of the regulator output voltages:

$$Vin = Vavg = \frac{\sum_{i=1}^{n}(Vout_i * Iout_i)}{\sum_{i=1}^{n} Iout_i}$$

For example, consider a system having three regulators, 10a, 10b, 10c, each providing a respective output voltage and current: $V_{OUT-A}$=48V @ $I_{OUT-A}$=1A, $V_{OUT-B}$=52V @ $I_{OUT-B}$=2A, and $V_{OUT-C}$=50V @ $I_{OUT-C}$=3A. Since all three regulators receive power from the same front end 21, the front-end voltage, $V_{IN}$, may be set to 50.33V, the weighted average of the three individual regulator output voltages, to maximize the overall system efficiency. The front end voltage may be set statically based upon expected operating parameters or may be determined periodically or continuously by monitoring the regulators in the system, e.g. the set point voltages and output currents of the regulators.

Figure 3:
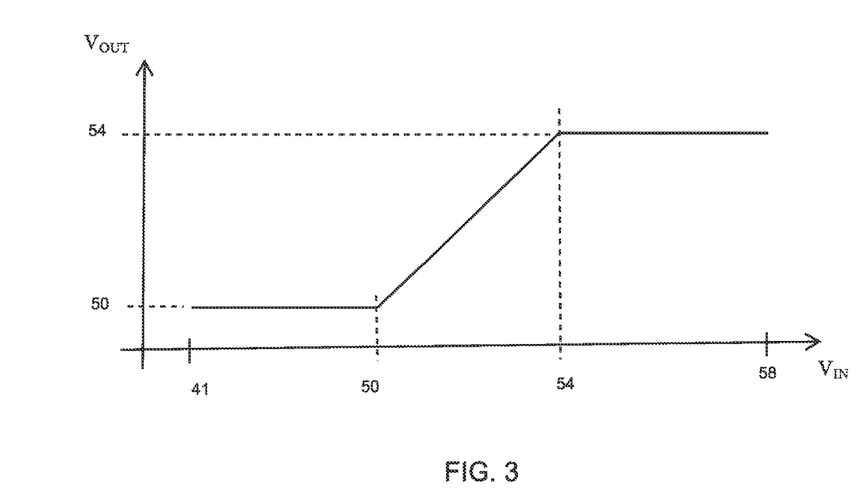
FIG. 3 shows a voltage transfer function for operation of a power regulator.

Many loads may be operated within a range of supply voltages, e.g. some telecom equipment may be operated with input voltages ranging from 50 to 54 Volts. The acceptable load voltage range may be exploited to further increase efficiency in power distribution. The transfer function of a regulator optimized for supplying a load that can accommodate a range of load voltages may adjust the regulator set point to match the input voltage for input voltages within the acceptable range for the load and regulate to an upper set point or lower set point within the acceptable range for input voltages that are respectively above or below the acceptable range. FIG. 3 shows a plot of the regulator output voltage, $V_{OUT}$, vs. the regulator input voltage, $V_{IN}$, for such a converter adapted to supply a load that can operate from 50 V to 54 V in a system in which the input voltages may range from 41 Volts or less to 58 Volts or more. As shown, the converter maintains a minimum output voltage, 50V, for input voltages ranging from the minimum, 41 V to 50V; to supply an output voltage essentially equal to the input voltage for input voltages within the acceptable range of the load, e.g. 50 to 54 Volts, i.e. the "input-tracking range"; and to maintain a maximum output voltage, e.g. 54 Volts for input voltages exceeding the maximum load voltage, e.g. 54V to 58V. The minimum and maximum set points of the converter may be adjusted higher or lower, respectively, to provide a margin of safety.

The system 20-2 shown in FIG. 2 may be configured for high voltage operation, for example with the regulator input voltage, $V_{IN}$, and regulator output voltage, $V_{OUT}$, set to 400 Volts (or any other suitable voltage) with the DC Transformer 23 providing isolation and voltage transformation down to a safe voltage for distribution within the system, e.g. $V_{LOAD}$ less than or equal to 50 Volts DC. Regardless of the nominal output voltage chosen for the regulator in the power distribution systems described above, the regulator may preferably be adapted for high efficiency operation in such a system. An improved controller for operating a ZVS buck-boost ("ZVS BB") regulator under such conditions is described below as an example of the regulator 10 in the foregoing power distribution architectures.

Figure 4:
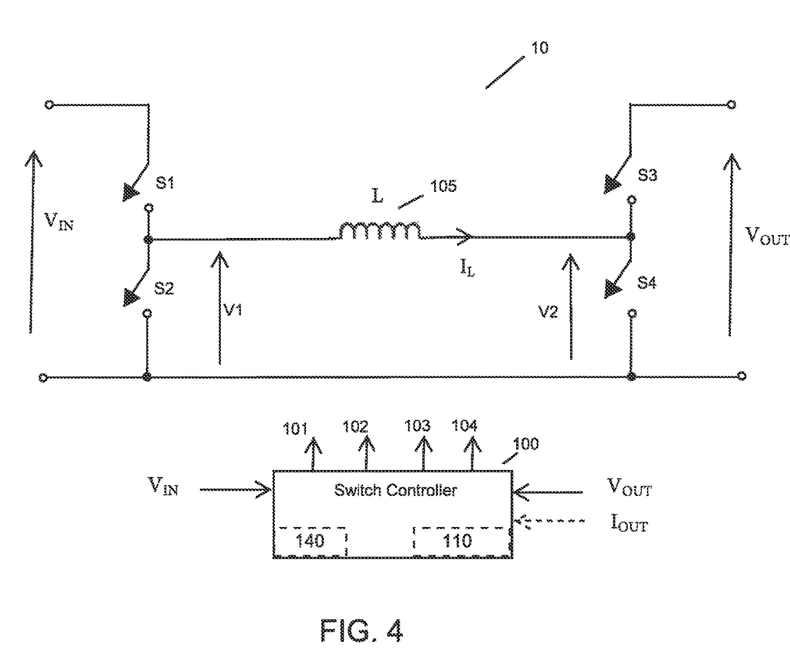
FIG. 4 shows a ZVS BB power converter topology.

The ZVS BB converter topology (described in detail in the Buck Boost Patent) is shown in FIG. 4 having a power inductor 105 connected between the input and out by four power switches, S1, S2, S3, S4. A switch controller 100 having inputs for monitoring the input voltage, the output voltage, and optionally the output current, and having connections 101, 102, 103, 104 to control switches S1, S2, S3, S4, respectively, is provided to control the switches. The switch controller may operate the switches in a series of converter operating cycles each of which include an input phase (S1 and S4 ON), and input-output phase (I-O phase) (S1 and S3 ON), a freewheeling phase (S2 and S3 ON), and a clamp phase (S2 and S4 ON) each separated by a respective ZVS phase. (Buck Boost Patent FIG. 4 and related description.) As shown in FIG. 4 of the present application, the controller 100 may include a supervisory microcontroller 140 which may generate the reference voltages required for input-tracking operation as described above in connection with FIG. 3; and an Adapter I-O Controller 110 which will be described in greater detail below in connection with FIGS. 5, 6, and 7. Details of the ZVS BB converter topology and its general operation are described in detail in the Buck Boost Patent.

Figure 5:
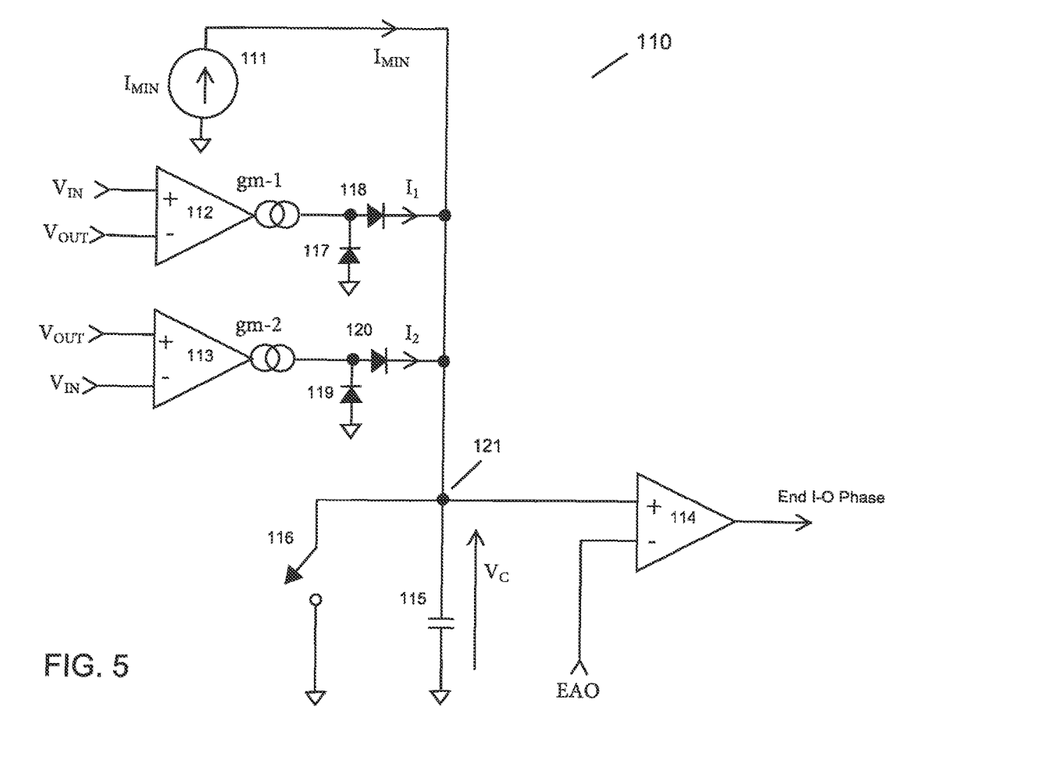
FIG. 5 shows an adaptive I-O phase controller.

FIG. 5 shows an "Adaptive I-O Controller" 110 for safely and predictably operating the ZVS-BB engine with extended input-output phases for increasing conversion efficiency of the ZVS-BB engine in a narrow input range mode and for maintaining output regulation outside the narrow input range to accommodate larger input voltage excursions, e.g. for use in the applications described above. The adaptive I-O controller 110 as shown includes a current source 111, which provides a current, $I_{MIN}$, to charge capacitor 115. Switch 116 when open allows the capacitor to charge, ramping the capacitor voltage, $V_C$, and when closed discharges the capacitor. A comparator 114 has inputs for comparing the capacitor voltage, $V_C$, to the error amplifier output, EAO, signal. The error amplifier of controller 100 (FIG. 4) generally compares the output voltage to a desired set point for maintaining regulation of the converter output. In systems that use the EAO signal as a threshold for generating timing signals, e.g. using a linear ramp, the EAO signal may provide an indication of the level of power being supplied by the converter 10. Because doubling the error signal leads to doubling the respective time interval (using a linear ramp), power is essentially quadrupled. In such an example, the EAO signal may be a nonlinear, e.g. an essentially square, function of the output power, or load current.

Transconductance amplifiers 112 and 113 are shown having differential inputs connected to monitor the difference between the converter input voltage, $V_{IN}$, and the converter output voltage, $V_{OUT}$. Each amplifier outputs a respective current, $I_1$ and $I_2$, which is a function of the differential input voltage multiplied by the amplifier transconductance, gm-1 and gm-2 respectively: $I_1$=gm-1 $(V_{IN}-V_{OUT})$ and $I_2$=gm-2 $(V_{OUT}-V_{IN})$. Diodes 118 and 120 respectively conduct positive currents, $I_1$ and $I_2$, for charging capacitor 115, and prevent the amplifiers from drawing negative current from the capacitor node 121, i.e. to prevent discharging capacitor 115 which would extend the maximum period set by current source 111 and capacitor 115. The diodes 118, 120 allow use of separate amplifiers having respective transconductances, gm-1 and gm-2, and therefore different slope responses to positive, $V_{IN}>V_{OUT}$, and negative, $V_{OUT}>V_{IN}$, voltage differentials. Diodes 117 and 119 provide a current path for when the amplifiers 112, 113 are sinking current, i.e. for negative currents. Accordingly, amplifier 112 sources a positive current, $I_1$, for $V_{IN}>V_{OUT}$ and amplifier 113 sources a positive current, $I_2$, for $V_{OUT}>V_{IN}$. As the voltage difference, $V_{IN}-V_{OUT}$ and $V_{OUT}-V_{IN}$, increases the magnitude of the respective output current also increases causing the capacitor to charge more quickly.

The operation of adaptive I-O controller 110 will be described in conjunction with FIGS. 4 through 7. In operation, switch 116 (FIG. 5) is opened at the start, time $t_2$, of the I-O phase (FIG. 6) by controller 100 (FIG. 4), allowing capacitor 115 to charge under the influence of current source 111 and amplifiers 112 and 113 (FIG. 5). FIG. 7 shows the capacitor voltage, $V_C$, plotted against time. When the capacitor voltage reaches the level set by the EAO signal, the comparator 114 generates the "end I-O Phase" signal to terminate the I-O phase (time $t_3$ in FIG. 6) in response to which controller 100 (FIG. 4) may turn OFF switch S1 beginning the ZVS transition of switch S2 and may close switch 116 once again in preparation of the next I-O phase. The adaptive I-O controller 110 controls the duration of the I-O phase as a function of the accumulated charge in capacitor 115 and the level of the EAO signal. Current source 111 provides a minimum current, $I_{MIN}$, to charge capacitor 115 setting a minimum slope (slope $m_1$ in FIG. 7) for the capacitor voltage, $V_C$, and thus a maximum duration for the I-O phase for any given level of EAO. In FIG. 7, the maximum duration for the I-O phase is shown as time $t_f$ the point at which $V_C$ charging at the rate set by $I_{MIN}$ reaches the level set by $EAO_{max}$.

Amplifiers 112 and 113 may provide additional current to charge the capacitor 115 as the difference between the input and output voltages increase, thereby reducing the duration of the I-O phase for any given power level, EAO. FIG. 7 shows a simplified example of an increase in slope at time tb from slope m1 to slope m2 reflecting the influence of an additional current, $I_1$ or $I_2$, from amplifiers, 112 or 113, respectively. The capacitor voltage, $V_C$, under the influence of $I_{MIN}$, without any contribution from either amplifier would reach the threshold $EAO_X$, at time td. In contrast, the capacitor voltage reaches the threshold $EAO_X$ earlier at time tc with additional current from one of the amplifiers. As illustrated, the contribution of amplifiers 112 and 113 increases the slope (from m1 to m2) and accordingly reduces the duration of the I-O phase for changes in voltage differential. The amplifiers however are prevented from sinking current from node 121 (FIG. 5) by diodes 118, 120, which would otherwise reduce the current charging capacitor 115 and extend the I-O phase duration beyond the maximum established by the current source. As shown in FIG. 7, the adaptive I-O controller 110 establishes a maximum I-O phase duration for any particular level of load when $V_{IN}=V_{OUT}$ ($I_1$, $I_2=0$) and shortens the duration as the voltage difference increases. As EAO increases, with converter 10 supplying more power, the comparator threshold also increases extending the duration of the I-O phase, and vice versa. The adaptive I-O controller 110 therefore sets a maximum duration for the I-O phase with the current source 111 (when $I_1$, $I_2=0$: $V_{IN}=V_{OUT}$) and the threshold set by the EAO signal, i.e. EAO=$EAO_{MAX}$, i.e. when the converter is supplying maximum power to the load.

Figure 6:
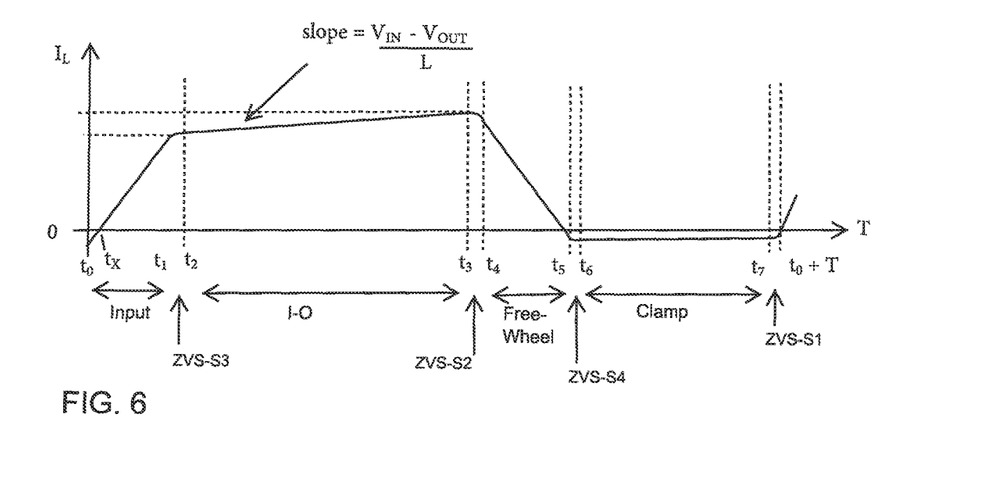
FIG. 6 shows a waveform for the converter of FIG. 4.
Figure 7:
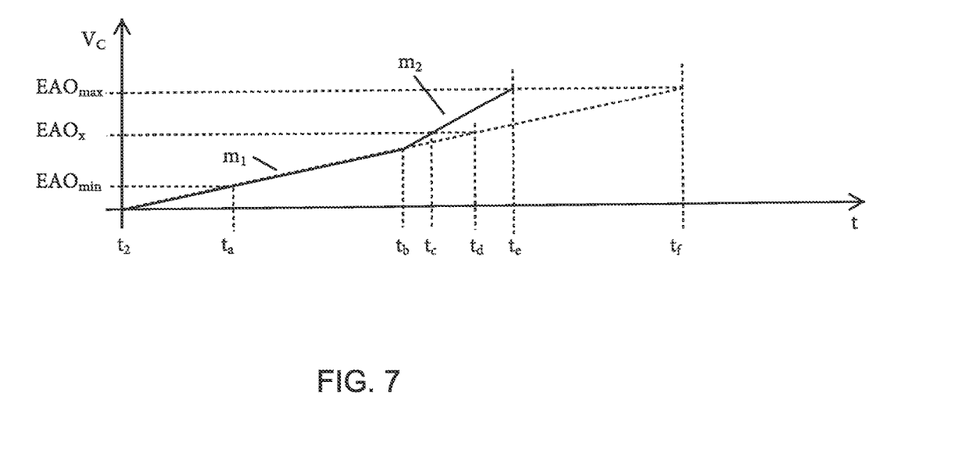
FIG. 7 shows operating waveforms for the adaptive I-O controller of FIG. 5.

FIG. 6 shows the phases of a converter operating cycle for the ZVS-BB converter 10. As noted in the figure, the slope of the inductor current, $I_L$, during the I-O phase is equal to the difference between the input voltage, $V_{IN}$, and output voltage, $V_{OUT}$, divided by the inductance L: slope=$(V_{IN}-V_{OUT})$/L. The slope is positive (as shown) and the inductor current, $I_L$, will increase while $V_{IN}$ is greater than $V_{OUT}$; negative and $I_L$ will decrease while $V_{IN}$ is less than $V_{OUT}$, and is zero and $I_L$ will remain essentially unchanged while $V_{IN}$ equals $V_{OUT}$ during the I-O phase. With the input and output voltages nearly equal, the inductor current will be nearly constant, allowing the I-O phase to be extended, potentially reducing switching and inductor's winding and core losses. The efficiency and power throughput of the ZVS-BB engine may thus be increased for operation within a narrow input range by extending the duration of the I-O phase (S1 and S3 ON).

The maximum duration for the I-O phase (for $V_{IN}=V_{OUT}$) may be set by selection of the minimum current, $I_{MIN}$, provided by source 111 and the capacitance 115. As discussed above, current source 111 in FIG. 6 establishes the minimum ramp rate for the capacitor voltage, $V_C$, (slope m1 in FIG. 7), which in turn establishes the maximum I-O phase duration for each power level. Appropriate selection of the maximum I-O phase duration enables the controller 110 to ensure proper operation of critical circuitry, e.g. the switch gate drive circuitry, particularly for floating switches S1 and S3, which may otherwise allow gate drive voltages to decay to unacceptable levels. Additionally, setting a limit to the I-O phase duration may be used to ensure that sufficient energy is maintained in the inductor to preserve ZVS operation, e.g. of switch S2. Furthermore, setting a sufficiently high minimum converter operating frequency enables the corner frequency of converter input and output filters to be set correspondingly high. The maximum I-O phase duration preferably may be set to 3 or more, e.g. 5, 10 or 20, times the minimum converter operating period, $T_{OP}$, of the converter. The gate drive circuitry may be scaled to operate within such a range without substantial decay of gate drive voltage levels. The benefits in converter efficiency of extending the I-O phase duration beyond 20 times the minimum converter operating period may be outweighed by such other considerations.

The adaptive I-O controller 110, as shown in FIG. 5, monitors the instantaneous load (EAO signal) and voltage conditions ($V_{IN}$, $V_{OUT}$) to quickly respond to changes during the present operating cycle, and even during the present I-O phase, reducing the duration of, or interrupting, the I-O phase, within the response time of the amplifiers 112, 113 and comparator 114. As $V_{IN}-V_{OUT}$ increases above zero, amplifier 112 increases current $I_1$ positively shortening the duration of the I-O phase to prevent excessive increases in inductor current, $I_L$, during the I-O phase, which if unchecked could saturate the inductor, potentially causing converter failure. Conversely, as $V_{IN}-V_{OUT}$ decreases below zero, amplifier 113 increases current $I_2$ positively also shortening the duration of the I-O phase to prevent excessive decreases in inductor current, $I_L$, which if unchecked may lower energy stored in the inductor 105 (FIG. 4) (from the input phase FIG. 6) to below a minimum level required for ZVS operation, e.g. reduction of the voltage across switch S2 before it is turned ON. Reduction or complete loss of ZVS operation may increase dissipation in, and potentially destroy, one or more of the power switches.

Because the capacitor voltage, $V_C$, is actually a function of the integration of charge over the course of the I-O phase and the currents $I_1$ and $I_2$ are functions of the instantaneous input-output voltage differential which may fluctuate throughout the I-O phase (i.e. $V_C$ may ramp erratically compared to the straight line depicted for slope m2 in FIG. 7), the controller 110 effectively tracks the volt-sec product of inductor 105 (FIG. 4) during the I-O phase. Therefore, should the voltage difference or load conditions change during an operating cycle, the controller 11 is adapted to respond quickly, interrupting or reducing the I-O phase duration, preventing the inductor 105 (FIG. 4) from saturating or losing too much energy resulting in a loss of ZVS. The transconductance amplifiers 112, 113 may be configured such that $I_1$, $I_2$ are much, e.g. 10 times or more, greater than $I_{MIN}$, for an input-output voltage differential of approximately ten percent to facilitate rapid charging of the capacitor 115, to end the I-O phase quickly, when the voltage differential warrants. The transconductance, gm-2, of amplifier 113 may be set to be greater than gm-1 of amplifier 112, allowing the capacitor voltage to charge faster (with a greater slope) giving the controller 110 greater sensitivity to operation in boost mode. For example, the transconductances gm-1 and gm-2, in a 48V regulator may be chosen to ensure that the respective output currents $I_1$, $I_2$ are greater than or equal to ten times $I_{MIN}$ for respective voltage differentials, $V_{OUT}-V_{IN}=6V$ and $V_{IN}-V_{OUT}=10V$, representing approximately 12.5% drop and 20.8% increase in voltage difference from the nominal set point. Notably, changes in load conditions are reflected by the EAO error signal (which sets the threshold at which comparator 114 terminates the I-O phase), allowing controller 110 to adjust the duration of the I-O phase, and of the preceding input phase, accordingly.

In one illustrative example in which the converter 10 (FIG. 4) may have a minimum operating period, $T_{OP-MIN}$, of 1.3 microseconds (750 KHz) and a maximum I-O phase duration of 0.50 microseconds (without extension), amplifiers 112 and 113 (FIG. 5) may have a large signal response time of 100 nanoseconds to perturbations in voltage differential, allowing the adaptive I-O controller 110 (FIG. 5) to respond to changes in the input-output voltage differential adaptively reducing the duration of the I-O phase within a response time, $T_R$, that is less than 100 nanoseconds. The controller may establish a cycle-by-cycle limit for the I-O phase duration, TIO-I, (determined by $I_{MIN}$ and EAO) between a minimum of 0.50 microseconds and a maximum of 3.0 microseconds. Accordingly, the controller response time, $T_R$, may be less than one or two times the cycle-by-cycle limit of the I-O phase duration, TIO-I, and, within 50 percent, or 30 percent, or even 10 percent, or less of the minimum converter operating period, $T_{OP-MIN}$.

In summary, the adaptive I-O controller 110 preferably: (a) establishes a cycle-by-cycle duration for the I-O phase, TIO-I, prior to the start of each converter operating cycle based on the absolute value of the difference between Vin and $V_{OUT}$, |Vin−$V_{OUT}$| and optionally the load; (b) monitors operating conditions, e.g. $V_{IN}$, $V_{OUT}$, or the difference between $V_{IN}$ and $V_{OUT}$, load current, $I_L$, etc., and adaptively reduces the duration of the I-O phase of a present operating cycle, TIO-P, to a value that is less than the cycle-by-cycle limit, TIO-I. The controller may establish a maximum duration for the I-O phase, TIO-MAX, that may range in value from one to twenty times the minimum operating period, TOP-MIN. The controller may extend the duration of the I-O phase while the ratio, R, of $V_{IN}/V_{OUT}$ remains either (a) within a predetermined range, (b) between a value less than one, corresponding to a boost mode of operation, and a value greater than one, corresponding to a buck mode of operation, (c) within a range between 0.3 and 1.3, or (d) within a range between 0.9 and 1.3. Furthermore, the controller reduces the I-O phase duration to a lesser extent for voltage changes in buck operation ($V_{IN}>V_{OUT}$) than in boost operation ($V_{OUT}>V_{IN}$). Preferably, the duration of the input-output phase is at least 75% of the duration of the converter operating cycle during operation with a predetermined range of values for the ratio R, e.g. $0.9 \leq R \leq 1.1$ and over a normal range of load current, e.g. $50\% \leq I_L \leq 100\%$, or $20\% \leq I_L \leq 100\%$ of $I_{L-max}$, etc.

The controller may alternatively set the duration, TIN, of the input phase as a function of the input voltage and the error signal, during which the input voltage is impressed across the inductor; determine a minimum duration, TIO-MIN, of the input-output phase, during which the inductor is coupled to the input port and the output port, as function of the input voltage, the output voltage, and an error signal representing differences between the output voltage and a first reference for regulating the output voltage; and determine an extension duration, TIO-ADD, of the input-output phase beyond the minimum TIO-MIN as a function of the ratio, R, of $V_{IN}/V_{OUT}$ within a first predetermined range to (i) be at a maximum, TIO-ADD=TIO-MAX, when the ratio R is substantially equal to one, (ii) decrease for $V_{IN}>V_{OUT}$ (buck operation) at a first slope (TIO-ADD=TIO-MAX-m1 ($V_{IN}-V_{OUT}$)), (iii) decrease for $V_{OUT}>V_{IN}$ (boost operation) at a second slope (TIO-ADD=TIO-MAX-m2 ($V_{OUT}-V_{IN}$)); limit the maximum duration, TIO-MAX, within a range that is between one and twenty times the minimum operating period, TOP-MIN; and set the total duration, TIO, of the input-output phase to the sum of TIO-MIN and TIO-ADD. The controller preferably accumulates the absolute value of the difference between VIN and VOUT, |VIN−VOUT| throughout the course of the input-output phase; and terminates the input-output phase before the time established by TIO-MIN+TIO-ADD within a period of time that is less than one or two times TIO-MIN. The controller may add the extension TIO-ADD while the ratio, R, of $V_{IN}/V_{OUT}$ remains within a predetermined range, e.g. $0.8 \leq R \leq 1.3$.

Using the adaptive I-O controller described above, the efficiency and power throughput of the ZVS-BB engine may be greatly increased, e.g. efficiency may be increased to peak values greater than 99% as total converter losses, including switching and inductor losses, are cut down, while operating within a narrow input range, e.g. whose voltage ratio "R" to the output voltage is close to 1, e.g., $V_{OUT}/V_{IN}=0.9$ to 1.1, by extending the duration of the I-O phase (S1 and S3 ON), e.g. in proportion to 1/(1−R) or a similar function. Output voltage regulation outside the narrow input voltage range may still be maintained, albeit at somewhat lower efficiency.

Referring once again to the transfer function plotted in FIG. 3, the microcontroller 140 of controller 100 (FIG. 4) may monitor the input voltage, $V_{IN}$, to provide the required reference voltage to the error amplifier to regulate the output voltage, $V_{OUT}$, to the desired output voltage. Using the transfer function shown in FIG. 3 as an example, for input voltages less than 50 Volts, between 50 and 54 volts, or greater than 54 Volts, the microcontroller 140 may provide a scaled (1/20) reference voltage equal to 2.5 Volts, $V_{IN}/20$, or 2.7 Volts, respectively. Optionally, the microcontroller 140 while operating the adaptive I-O controlled ZVS-BB converter within the input-tracking range (FIG. 3: $50 \leq V_{IN} \leq 54$ Volts) may set the output voltage as a function of the input voltage and output current, e.g. $V_{OUT}=V_{IN}-R*I_{OUT}$, where R represents the lumped, temperature-dependent resistance of switches S1 and S3 and inductor 105 (FIG. 4) to minimize power dissipation and ripple voltage while allowing the I-O phase to be extended within the limits set by the control system as discussed above. The microcontroller may as shown in FIG. 4 adjust the reference voltage for the lumped resistance in the input tracking range by monitoring the output current, $I_{OUT}$, which may be sensed directly, estimated, calculated, e.g. using the error amplifier output, or other known techniques, or even assumed. The microcontroller may further refine the adjustment, i.e. the lumped resistance value, by monitoring the temperature of the converter. Preferably, a low pass filter may be used to filter the input voltage for the set point calculation allowing the regulator to provide effective filtering from input to output, e.g. while in the input-tracking range of $V_{IN}$.

In an alternate method of adaptive I-O control, the controller may track the flux level in the inductor 105, e.g. by tracking the volt-seconds product of the inductor, causing the inductor current to ramp to a desired flux level during the input phase, and extend the I-O phase for as long the flux remains within a predetermined range of the desired flux level, e.g. within 20 percent above or below, and terminating the I-O phase when the flux level extends outside of the predetermined range.

It will be appreciated that as described above, the Adaptive I-O controller may operate the ZVS BB engine throughout the input voltage range using the same sequence of phases (Input, ZVS, Input-Output, ZVS, Freewheeling, ZVS, Clamp, ZVS) and thus the same sequence of switch transitions (S1 to ON, S4 to OFF, S3 to ON, S1 to OFF, S2 to ON, S3 to OFF, S4 to ON, S2 to OFF, and repeat) in each converter operating cycle independently of any extension of the I-O phase. The adaptive I-O converter may achieve peak efficiencies using extended I-O phases, that approach the DC limit of the converter in a perpetual I-O state (S1 and S3 ON perpetually), which at any given output current, $I_L$, is determined by the DC losses in switches S1 and S3 and inductor 105, $P_{DC}=I_{L2} R_{eff}$, where $R_{eff}$ represents the combined DC resistance of switches S1 and S3 and inductor 105 (FIG. 4). For example, the adaptive I-O converter may achieve a minimum converter operating loss (averaged over a respective converter operating cycle) that is less than or equal to three times the DC limit, $P_{OP-MIN} \leq 3*P_{DC}$. Accordingly an adaptive I-O converter operating at a load current for which the DC power loss is 0.3% may operate the switches in a series of converter operating cycles, each including the typical switching sequence adjusting the input-output phase of each converter operating cycle to have a duration, TIO, that is less than or equal to a predetermined maximum, TIO-MAX, when $V_{IN}/V_{OUT}$ is substantially equal to one and decreases to a predetermined minimum, TIO-MIN as the absolute value of the difference, $V_{IN}-V_{OUT}$, increases with a power loss averaged over the duration of the respective converter operating cycle that is less than or equal to 0.9% achieving 99.1% or even 99.4% peak efficiency. Operating the converter in such a continuous series of converter operating cycles having a minimum operating period, TOP-MIN, and having essentially the same sequence of switch transitions avoids the latency inherent in terminating or changing the sequence of switch transitions, thus enabling faster transient response and higher power density.

A number of embodiments of the invention have been described. Nevertheless, it will be understood that various modifications may be made without departing from the spirit and scope of the invention. For example, in the power systems of FIGS. 1 and 2, the regulator may be configured to regulate the output voltage to a set point that is approximately or exactly equal to the average voltage provided by the front end. Alternatively, the front end may be configured to provide an input voltage that approximates the voltage required by the load 22 or DC transformer 23, allowing the regulation stage to operate primarily within a very narrow range maximizing system efficiency.

The disclosure is described above with reference to drawings. These drawings illustrate certain details of specific embodiments that implement the systems, apparatus, and/or methods of the present disclosure. However, describing the disclosure with drawings should not be construed as imposing on the disclosure any limitations that may be present in the drawings. No claim element herein is to be construed as a "means plus function" element unless the element is expressly recited using the phrase "means for." Furthermore, no element, component or method step in the present disclosure is intended to be dedicated to the public, regardless of whether the element, component or method step is explicitly recited in the claims.

It should be noted that although the disclosure provided herein may describe a specific order of method steps, it is understood that the order of these steps may differ from what is described. Also, two or more steps may be performed concurrently or with partial concurrence. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and its practical application to enable one skilled in the art to utilize the disclosure in various embodiments and with various modifications as are suited to the particular use contemplated.

What is claimed is:

1. Apparatus comprising:
a non-isolated buck-boost switching power converter adapted to convert power from an input port at an input voltage, $V_{IN}$, to an output port at an output voltage, $V_{OUT}$, in a series of converter operating cycles having a minimum operating period, TOP-MIN;
the power converter including an inductor, a first switch, a second switch, and a controller connected to control the first and second switches;
the first and second switches being arranged to couple the inductor to the input port and the output port of the converter during an input-output phase of each converter operating cycle;
wherein the controller is configured to adjust the input-output phase as a function of a ratio, R, of $V_{IN}/V_{OUT}$ within a first predetermined range to (a) have a duration, TIO, that is at a maximum, TIO-MAX, when $V_{IN}/V_{OUT}$ is substantially equal to one; (b) have the duration, TIO, decreasing (i) for buck operation as a first function of $V_{IN}-V_{OUT}$ increasing above zero and having a first slope for a difference, $V_{IN}-V_{OUT}$, and (ii) for boost operation as a second function of $V_{OUT}-V_{IN}$ increasing above zero and having a second slope for a difference, $V_{OUT}-V_{IN}$; wherein (c) the maximum duration, TIO-MAX, is greater than the minimum operating period, TOP-MIN, and less than twenty times the minimum operating period, TOP-MIN.

2. The apparatus of claim 1 wherein the controller is further configured to:
determine a cycle-by-cycle limit for the duration of the input-output phase, TIO-I based on the absolute value of the difference between $V_{IN}$ and $V_{OUT}$, $|V_{IN}-V_{OUT}|$;
reduce the duration of the input-output phase of a present operating cycle, TIO-P, to a value that is less than the cycle-by-cycle limit, TIO-I;
perform the determining and reducing within a period of time that is less than twice the cycle-by-cycle limit, TIO-I.

3. The apparatus of claim 2 wherein the controller is further configured to:
perform the determining and reducing within a period of time that is less than the cycle-by-cycle limit, TIO-I.

4. The apparatus of claim 2 wherein the controller is further configured to perform the determining and reducing within a period of time that is less than 50% of the minimum operating period, TOP-MIN.

5. The apparatus of claim 2 wherein the controller is further configured to perform the determining and reducing within a period of time that is less than 25% of the minimum operating period, TOP-MIN.

6. The apparatus of claim 2 wherein the controller is further configured to perform the determining and reducing within a period of time that is less than 10% of the minimum operating period, TOP-MIN.

7. The apparatus of claim 1 wherein the first predetermined range of the ratio $V_{IN}/Vo$ varies between a value less than one, corresponding to boost operation, and a value greater than one, corresponding to buck operation.

8. The apparatus of claim 7 wherein the predetermined range varies between 0.8 and 1.3.

9. The apparatus of claim 7 wherein the predetermined range varies between 0.7 and 1.5.

10. The apparatus of claim 7 wherein the first slope for buck operation is less than the second slope for boost operation.

11. The apparatus of claim 1 wherein the maximum duration, TIO-MAX, is greater than three times the minimum operating period, TOP-MIN.

12. The apparatus of claim 1 wherein the maximum duration, TIO-MAX, is less than ten times the minimum operating period, TOP-MIN.

13. The apparatus of claim 1 wherein the function includes integrating deviations between $V_{IN}$ and $V_{OUT}$.

14. The apparatus of claim 13 wherein the function includes multiplying the absolute value of $|V_{IN}-V_{OUT}|$ by a first coefficient for buck operation and a second coefficient for boost operation, wherein decreases in TIO for a given voltage differential are greater for buck operation than for boost operation.

15. The apparatus of claim 13 wherein the function further includes comparing the results of the integration with a threshold that is a function of a current being delivered to the output port.

16. The apparatus of claim 15 wherein the function provides a longer TIO for higher current being delivered to the output port than for lower current.

17. The apparatus of claim 1 wherein the first predetermined range of the ratio $R=V_{IN}/Vo$ varies between one and a value less than one, corresponding to boost operation.

18. The apparatus of claim 17 wherein the value less than one is more than 0.8.

19. The apparatus of claim 17 wherein the value less than one is more than 0.7.

20. The apparatus of claim 1 wherein the first predetermined range of the ratio $R=V_{IN}/Vo$ varies between one and a value greater than one, corresponding to buck operation.

21. The apparatus of claim 20 wherein the value greater than one is less than 1.5.

22. The apparatus of claim 1 wherein the controller is further adapted to regulate the output voltage VOUT to be equal to an average of the input voltage reduced by a current delivered to the output port multiplied by a resistance coefficient.

23. The apparatus of claim 22 wherein the resistance coefficient is a function of a temperature dependent resistance of the first and second switches and of the inductor.

24. The apparatus of claim 1, wherein the first function is a linear function.

25. The apparatus of claim 1, wherein the second function is a linear function.

26. A method of converting power from an input port at an input voltage, $V_{IN}$, to an output port at an output voltage, $V_{OUT}$, comprising:
   providing an inductor and a first switch connected to the inductor and a second switch connected to the inductor;
   using a controller having control circuitry to
      (a) operate the first switch and the second switch in a series of converter operating cycles, each converter operating cycle having:
         (i) a duration, TOP,
         (ii) an input phase having a duration, TIN, during which the input voltage is impressed across the inductor,
         (iii) an input-output phase having a duration, TIO, during which the first and second switches couple the inductor to the input port and the output port, and
         (iv) a ZVS interval during which one or more switches are discharged by a current flowing in the inductor;
      (b) generate an error signal representing differences between the output voltage and a first reference for regulating the output voltage;
      (c) set the duration, TIN, of the input phase as a function of the input voltage and the error signal;
      (d) determine a minimum duration, TIO-MIN, of the input-output phase as function of the input voltage, the output voltage, and the error signal;
      (e) determine an extension duration, TIO-ADD, of the input-output phase beyond the minimum TIO-MIN as a function of the ratio, R, of $V_{IN}/V_{OUT}$ within a first predetermined range to:
         (i) be at a maximum, TIO-ADD=TIO-MAX, when the ratio R is substantially equal to one,
         (ii) decrease for $V_{IN}>V_{OUT}$ (buck operation) at a first slope (TIO-ADD=TIO-MAX-m1 $(V_{IN}-V_{OUT})$), and
         (iii) decrease for $V_{OUT}>V_{IN}$ (boost operation) at a second slope (TIO-ADD=TIO-MAX-m2 $(V_{OUT}-V_{IN})$),
      (f) limit the maximum duration, TIO-MAX, within a range that is between one and twenty times the minimum operating period, TOP-MIN;
   wherein the total duration, TIO, of the input-output phase is set to the sum of TIO-MIN and TIO-ADD.

27. The method of claim 24 wherein the first predetermined range comprises values of R ranging from 0.9 to 1.1.

28. The method of claim 24 wherein the extension duration, TIO-ADD, is at a maximum (TIO-ADD=TIO-MAX) when the output voltage is equal to the input voltage minus the product of the load current, $I_L$, and a lumped series resistance, Rt, of the converter ($V_{OUT}=V_{IN}-I_L*Rt$).

29. The method of claim 24 wherein the controller further limits the total duration, TIO, of the input-output phase to ensure ZVS operation of at least one of the switches at the end of the input-output phase.

30. The method of claim 26 further comprising using the controller to:
   (g) accumulate the absolute value of the difference between VIN and VOUT, |VIN−VOUT| throughout the course of the input-output phase; and
   (h) terminate the input-output phase at a time before TIO determined by the accumulation;
   wherein the accumulating (g) and terminating (h) are performed within a period of time that is less than TIO-MIN.

31. The method of claim 26 wherein the total duration TIO, of the input-output phase is at least 75% of the duration, TOP, of the converter operating cycle within a normal operating range of load current, IL, and with the ratio R being within the first predetermined range.

32. The method of claim 26, wherein m1 is linear.

33. The method of claim 26, wherein m2 is linear.

34. A method of converting power from a source, at a source voltage, $V_{SRC}$, to an output port at an output voltage, $V_{OUT}$, comprising:
   providing a front end circuit having a front end ("FE") input for receiving power from the source, a FE output for providing power at a front-end output voltage, VO-FE, and power conversion circuitry;
   providing a buck-boost switching regulator circuit having a regulator input connected to receive power from the FE output, a regulator output for supplying power at a regulated output voltage, $V_{REG}$, and power conversion circuitry including an inductor, a first and second switch coupled to the inductor, and a controller;
   using the controller to operate the first switch and the second switch in a series of converter operating cycles, having an input-output phase during which the first and second switches couple the inductor to the regulator input and the regulator output;
   using the controller to establish a minimum converter operating period, TOP-MIN, and adjust the duration, TIO, of the input-output phase as a function of the ratio, R, of $V_{IN}/V_{OUT}$ within a first predetermined range to (a) be at a maximum, TIO-MAX, when $V_{IN}/V_{OUT}$ is substantially equal to one; (b) decrease for $V_{IN}>V_{OUT}$ (buck operation) from the maximum at a first slope (TIO=TIO-MAX-m1 $(V_{IN}-V_{OUT})$); (c) decrease for $V_{OUT} > V_{IN}$ (boost operation) from the maximum at a second slope (TIO=TIO-MAX-m2 $(V_{OUT}-V_{IN})$); (d) limit the maximum duration, TIO-MAX, within a range that is between one and twenty times the minimum operating period, TOP-MIN.

35. The method of claim 30 further comprising determining an average of the front-end output voltage, VO-FE$_{AVG}$, and controlling the buck-boost switching regulator to set the regulated output voltage, $V_{REG}$, equal to VO-FE$_{AVG}$–C, where C is a function of output current.

36. The method of claim 30 further comprising using a DC transformer to convert power received from the buck-boost switching regulator at the regulated voltage, $V_{REG}$, for delivery to a load at a unipolar load voltage, $V_{LOAD}$, via a transformer at an essentially fixed voltage transformation ratio, $K=V_{LOAD}/V_{REG}$.

37. The method of claim 34 further comprising adjusting an envelope of current drawn by the buck-boost switching regulator from the front end circuit to approximate a waveform of the source voltage.

38. The method of claim 34 further comprising adjusting an envelope of current drawn by the buck-boost switching regulator from the front end circuit to approximate a waveform of the output voltage of the front end, VO-FE.

39. The method of claim 34 further comprising setting the front-end output voltage, VO-FE, to a value that is approximately equal to the regulated output voltage, $V_{REG}$.

40. The method of claim 34 further comprising determining an average of the front-end output voltage, VO-FE$_{AVG}$, and controlling the buck-boost switching regulator to set the regulated output voltage, $V_{REG}$, equal to VO-FE$_{AVG}$–C, where C is a constant.

41. The method of claim 34, wherein m1 is linear.

42. The method of claim 34, wherein m2 is linear.

43. Apparatus comprising:
a non-isolated buck-boost switching power converter adapted to convert power from an input port at an input voltage, $V_{IN}$, to an output port at an output voltage, $V_{OUT}$, and an output current, $I_{OUT}$, in a series of converter operating cycles having an minimum operating period, TOP-MIN;
the power converter including an inductor having a DC resistance RL, a first switch having an ON resistance RS$_1$, a second switch having an ON resistance RS$_2$, and a controller connected to control the first and second switches;
the first and second switches being arranged to couple the inductor to the input port and the output port of the converter during an input-output phase of each converter operating cycle;
wherein the controller is configured to adjust the input-output phase of each converter operating cycle to have a duration, TIO, that is less than or equal to a predetermined maximum, TIO-MAX, when $V_{IN}/V_{OUT}$ is substantially equal to one and decreases to a predetermined minimum, TIO-MIN as the absolute value of a difference, $V_{IN}-V_{OUT}$, increases;
and wherein power dissipation in the converter, averaged over the duration of a respective converter operating cycle, operated at the output current, $I_{OUT}$, is less than three times the square of $I_{OUT}$ times the sum of RL, RS$_1$ and RS$_2$.

44. Apparatus comprising:
a switching regulator adapted to convert power from an input port at an input voltage, $V_{IN}$, for delivery to an output port at an output voltage, $V_{OUT}$, within an acceptable output voltage range having a minimum, $V_{OUT-MIN}$, and a maximum, $V_{OUT-MAX}$, in a series of converter operating cycles having a predetermined minimum operating period, TOP-MIN, and a predetermined maximum operating period, TOP-MAX;
the switching regulator including an inductor, one or more power switches, and a controller connected to control the one or more power switches;
the one or more switches being arranged to couple the inductor to the input port and the output port of the converter during an input-output phase of each converter operating cycle;
wherein the controller turns the one or more switches ON and OFF during each converter operating cycle;
wherein the controller is configured to control the output voltage, $V_{OUT}$, to be essentially equal to: (a) the input voltage while the input voltage remains within the acceptable output voltage range; (b) $V_{OUT-MIN}$ while the input voltage $V_{IN}$ is below $V_{OUT-MIN}$; and (c) $V_{OUT-MAX}$ while the input voltage $V_{IN}$ is greater than $V_{OUT-MAX}$
wherein $V_{OUT-MAX}$ is greater than $V_{OUT-MIN}$.

45. The apparatus of claim 44 wherein the acceptable output voltage range is less than 10 percent of a nominal output voltage $V_{OUT-MIN}$.

46. The apparatus of claim 44 wherein the controller is configured to adjust the input-output phase as the ratio of $V_{IN}/V_{OUT}$ varies within a first predetermined range to (a) have a duration, TIO, that is at a maximum, TIO-MAX, when $V_{IN}/V_{OUT}$ is substantially equal to one; (b) the duration, TIO, decreasing (i) as a first function of $V_{IN}-V_{OUT}$ increasing above zero and having a first slope for a difference, $V_{IN}-V_{OUT}$, and (ii) as a second function of $V_{OUT}-V_{IN}$ increasing above zero and having a second slope for a difference, $V_{OUT}-V_{IN}$; and (c) the maximum duration, TIO-MAX, being greater than the minimum operating period, TOP-MIN, and less than twenty times the minimum operating period, TOP-MIN.

47. The apparatus of claim 46 wherein the first slope for boost operation is greater than the second slope for buck operation.

48. The apparatus of claim 46 wherein the maximum duration, TIO-MAX, is greater than three times the minimum operating period, TOP-MIN.

49. The apparatus of claim 46 wherein the maximum duration, TIO-MAX, is less than ten times the minimum operating period, TOP-MIN.

50. The apparatus of claim 46 wherein the controller is further configured to:
determine a cycle-by-cycle limit for the duration of the input-output phase, TIO-I based on the absolute value of the difference between $V_{IN}$ and $V_{OUT}$, $|V_{IN}-V_{OUT}|$;
reduce the duration of the input-output phase of a present operating cycle, TIO-P, to a value that is less than the cycle-by-cycle limit, TIO-I;
perform the determining and reducing within a period of time that is less than twice the cycle-by-cycle limit, TIO-I.

51. The apparatus of claim 46, wherein the first function is a linear function.

52. The apparatus of claim 46, wherein the second function is a linear function.

* * * * *